(12) United States Patent
Dirnberger et al.

(10) Patent No.: US 7,637,976 B2
(45) Date of Patent: Dec. 29, 2009

(54) FILTER ELEMENT

(75) Inventors: Timo Dirnberger, Marbach (DE); Christoph Baumann, Moeglingen (DE); Guenter Jokschas, Murrhardt (DE); Markus Roehrig, Landshut (DE)

(73) Assignee: Mann & Hummel GmbH, Ludwigsburg (DE)

( * ) Notice: Subject to any disclaimer, the term of this patent is extended or adjusted under 35 U.S.C. 154(b) by 447 days.

(21) Appl. No.: 11/452,264

(22) Filed: Jun. 14, 2006

(65) Prior Publication Data

US 2006/0283161 A1 Dec. 21, 2006

(30) Foreign Application Priority Data

Jun. 15, 2005 (DE) .................. 20 2005 009 468 U

(51) Int. Cl.
*B01D 46/02* (2006.01)
*B01D 50/00* (2006.01)
(52) U.S. Cl. .................. 55/385.3; 55/343; 55/484; 55/485; 55/497; 55/502; 55/DIG. 31; 55/472; 55/473; 123/198 E
(58) Field of Classification Search ............ 55/343, 55/484, 485, 497, 498, 502, DIG. 31, 472, 55/473, 385.3; 123/198 E
See application file for complete search history.

(56) References Cited

U.S. PATENT DOCUMENTS

| | | | | |
|---|---|---|---|---|
| 3,144,315 A | * | 8/1964 | Hunn | 96/421 |
| 3,747,772 A | * | 7/1973 | Brown | 210/493.1 |
| 4,684,381 A | * | 8/1987 | Wasylyniuk | 96/138 |
| 4,743,280 A | * | 5/1988 | Pappas | 55/429 |
| 4,828,590 A | * | 5/1989 | Eckstein et al. | 96/133 |

(Continued)

FOREIGN PATENT DOCUMENTS

DE 42 18 396 A1 12/1993

(Continued)

OTHER PUBLICATIONS

European Search Report dated Sep. 5, 2006 with an English translation of the pertinent portion (seven (7) pages).

*Primary Examiner*—Robert A Hopkins
*Assistant Examiner*—Minh-Chau T Pham
(74) *Attorney, Agent, or Firm*—Crowell & Moring LLP

(57) ABSTRACT

An air filter insert including at least one filter element (2; 4; 11) and a seal (3; 7) extending along outer edges of one side of the filter insert (2; 4; 11) and via which the filter insert is sealingly seated against housing sections (5, 6) of a surrounding filter housing. The filter insert (2; 4; 11) is configured such that the air can easily flow into or out of the structural space on the one side of the filter element with a minimum pressure drop. The filter insert (11) may be at least partially covered on the inflow and/or discharge side by a semi-permeable component (12), which at least partially equalizes the pressure distribution in the air stream. The filter element also may be supported in the filter housing via a circumferential seal (7) which is disposed on the outer periphery of the filter insert and received in a seat (8) of a lower housing section (5), and a sealing pressure is applied by an upper housing section (6), so that the overall height of the filter insert is decreased and the surface of the seal (7) is substantially co-planar with the surface of the filter insert (4).

3 Claims, 1 Drawing Sheet

U.S. PATENT DOCUMENTS

| | | | | |
|---|---|---|---|---|
| 4,861,359 | A * | 8/1989 | Tettman | 55/419 |
| 4,865,636 | A * | 9/1989 | Raber | 55/484 |
| 5,014,608 | A | 5/1991 | Benson et al. | |
| 5,141,540 | A | 8/1992 | Helmus | |
| 5,290,344 | A * | 3/1994 | Onodera | 96/127 |
| 5,391,212 | A | 2/1995 | Ernst et al. | |
| 5,429,742 | A * | 7/1995 | Gutman et al. | 210/321.75 |
| 5,853,445 | A * | 12/1998 | Wong et al. | 55/343 |
| 6,312,489 | B1 | 11/2001 | Ernst et al. | |
| 6,709,480 | B2 * | 3/2004 | Sundet et al. | 55/499 |
| 6,740,137 | B2 * | 5/2004 | Kubokawa et al. | 55/521 |
| 6,740,149 | B2 * | 5/2004 | Sudoh | 96/384 |
| 6,825,136 | B2 * | 11/2004 | Cook et al. | 442/6 |
| 6,840,387 | B2 * | 1/2005 | Beer et al. | 210/490 |
| 2002/0104299 | A1 * | 8/2002 | Chang | 55/497 |
| 2004/0163372 | A1 * | 8/2004 | Nguyen | 55/497 |

FOREIGN PATENT DOCUMENTS

| | | |
|---|---|---|
| DE | 198 16 431 A1 | 10/1998 |
| WO | WO 96/16717 A1 | 6/1996 |

* cited by examiner

FILTER ELEMENT

BACKGROUND OF THE INVENTION

The invention relates to a filter element, particularly for filtering the intake air of an internal combustion engine, which is constructed to minimize the pressure drop across the filter.

U.S. Pat. No. 6,312,489 (=DE 198 16 431), for example, discloses a filter element in which the folded filter insert has a contour on one side that at least partially deviates from a plane in two dimensions and is zig-zag folded or pleated throughout. According to the description of this published application, the filter element may be readily adapted or fitted to complex structures in the intake area of an internal combustion engine to optimize the filtering effect through better use of the space in the area on the intake side of the filter insert. Because the filter element is well seated against the structural configuration of the intake tract, the described filter element also improves the flow behavior on the air inlet side of the filter element.

U.S. Pat. No. 5,391,212 (=DE 42 18 396) discloses the production of filter elements, particularly for use in internal combustion engines of trucks and construction machinery, with a relatively large filter surface. These filter elements have a seal on one side, which extends at least along the rim so as to achieve a tight seal between the unfiltered air side and the filtered air side of the filter element.

These prior-art filter elements may be configured to take into account specific geometries in the filter housing or on the adjacent units by connecting together separate filter elements whose folds have different heights. The individual filter elements are manufactured separately and are interconnected by additional connecting webs, which also act as hinges.

SUMMARY OF THE INVENTION

It is an object of the invention to provide an improved filter element suitable for use in an air filter of an internal combustion engine.

Another object of the invention is to provide an air filter element with which a reliable, tight seal can be obtained between the filter insert and a surrounding filter housing.

A further object of the invention is to provide an air filter element with which the air flow behavior can be readily optimized.

It is also an object of the invention to provide an air filter with which the pressure drop across the filter can be minimized while maintaining a tight seal between the filter element and a surrounding filter housing.

These and other objects are achieved in accordance with the present invention by providing a filter insert for an air filter comprising at least one filter element and a seal element extending along outer edges of one side of the filter element, which seal serves to sealingly seat the filter insert against housing sections of a surrounding filter housing, and in which the filter insert is configured in such a way that air can readily flow into or out of a structural space adjacent said one side of the filter element with a minimum pressure drop.

Along the outer edges of the filter insert on one side of the filter element according to the invention, the filter element advantageously has a circumferential seal with which the filter element is seated against housing sections of a filter housing. The filter insert is configured in such a way that the air on at least one side of the filter element can freely flow into and out of the structural space inside the housing adjacent the face of the filter element with a minimum pressure drop and an optimum flow behavior.

In one advantageous embodiment of the invention, the filter insert is at least partly covered by a semi-permeable component on the inflow and/or discharge side, which causes an at least partial equalization of the pressure distribution in the air stream. The semi-permeable component may easily be accommodated in a frame covering the entire filter surface. The remaining part of the frame serves to support the filter surface. The semi-permeable component may advantageously be constructed in the form of a perforated plate.

With the invention, the air stream flowing into or out of the air filter is uniformly distributed by the partial covering of the filter element. The effect of this optimized distribution of the air stream is that it can be achieved, for example, even if the filter element is laden with dust. Without the proposed covering, only partial areas of the filter insert would initially be covered with dust, and the other areas would only subsequently become dust-covered. This can cause a change in the flow in the area of an air mass sensor, which is mounted in a certain region of the filter insert. Thus, the partial covering of the filter element by the semi-permeable component has the advantage of preventing, or at least substantially reducing, signal drift in the air mass sensor.

In another advantageous embodiment of the invention, the filter element is supported in the filter housing by a circumferential seal in such a way that the seal is located on the outside in a recess of the lower housing section and a sealing pressure is applied by the upper housing section such that the seal substantially terminates even with the surface of the filter insert, or in other words such that the face of the seal is substantially co-planar with the face of the filter element.

The filter element according to this preferred embodiment of the invention uses a seal (e.g., a foam seal) which is no taller than the filter insert itself. This seal makes it possible, in air filter designs where the air flows in and out above the sealing foam, to use the resulting additional structural space adjacent the face of the filter as an inflow or outflow cross-section. This makes it easier for air to flow uniformly across the entire surface of the filter and substantially reduces the pressure drop across the air filter, for instance in the intake tract of an internal combustion engine.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
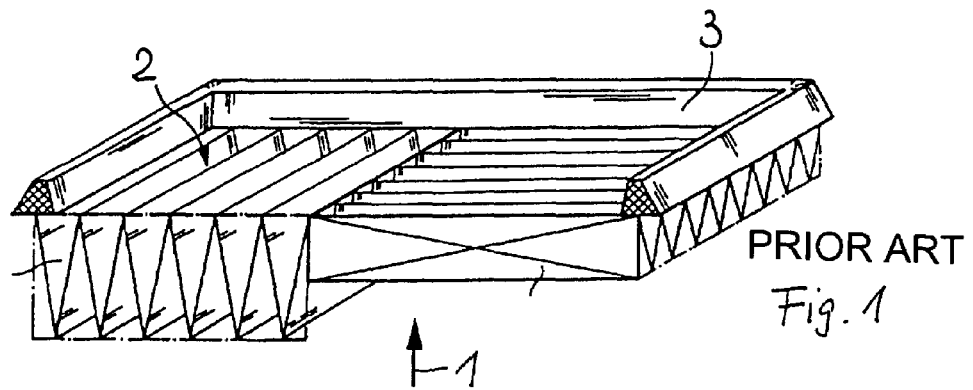
FIG. 1 is a perspective view of a prior art filter element comprising several different partial filter inserts.

FIG. 1 is a sectional view of a filter element 1 of an air filter for an internal combustion engine constructed according to the teachings of U.S. Pat. No. 6,312,489 comprising a filter insert 2, which has a folded area on the right where the height of the folds is relatively low and a folded area on the left where the height of the folds is relatively high. The filter element 1 is provided with a circumferential seal 3 that is located substantially above the one side of the filter element 1 and is adapted to mate with corresponding seal seats in a filter housing (not shown).

Figure 2:
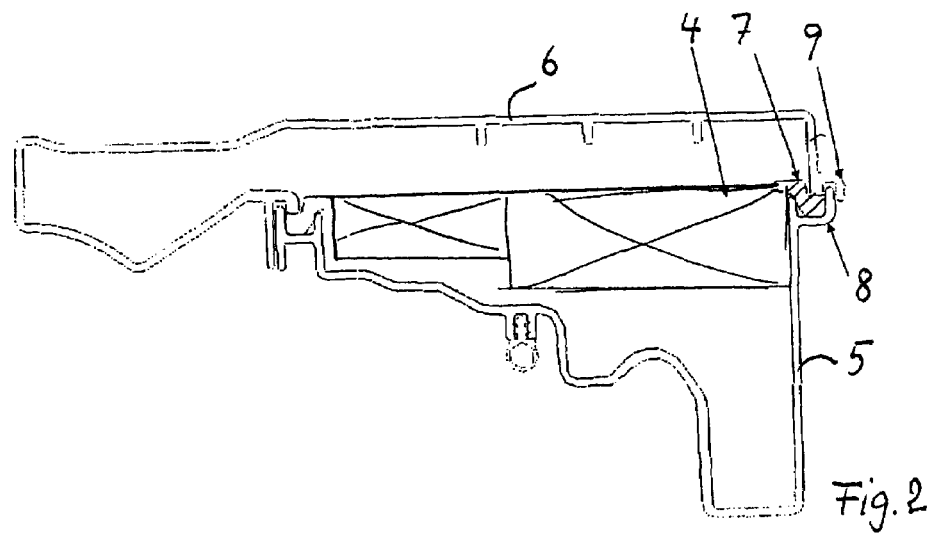
FIG. 2 is a sectional view of a filter housing having a filter element comparable to the filter element of FIG. 1, but provided with an external seal.

FIG. 2 is a sectional view of a filter with a filter insert 4 according to the invention located in a lower housing section 5. An upper housing section 6 is provided for placement on lower housing section 5 to provide an enclosed housing surrounding the filter element. Filter insert 4 has a circumferential seal 7 (for example, in the form of a foamed gasket) that is mounted substantially on the side of the filter insert 4 and is received in a seal seat 8 in the lower housing section 5. The sealing effect is provided by a corresponding sealing rim 9 on the upper housing section 6, which overlaps the seal seat 8 and presses against the seal 7.

The lateral placement of the seal 7 enables the overall height of the filter insert 4 to be reduced compared to a filter element in which the seal is positioned on the flow face. This seal 7 enables the air to flow in or out above the sealing foam so that the resulting additional structural space above the filter insert can be used as an inflow or outflow cross-section, whereby the pressure drop across the filter with the filter insert 4 is reduced.

Figure 3:
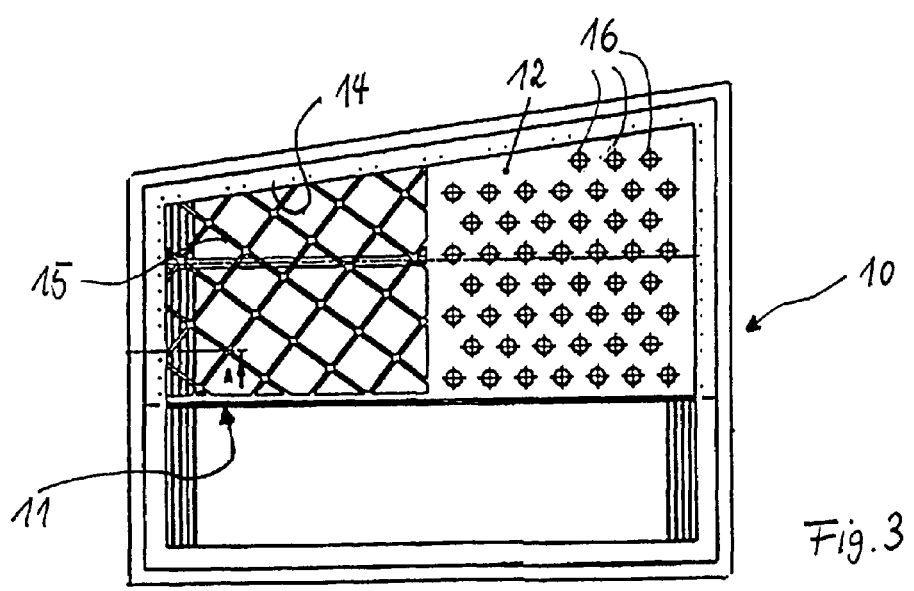
FIG. 3 is a illustrative embodiment of a filter element according to the present invention with a semi-permeable cover.

In the illustrative embodiment shown in FIG. 3, a filter element 10 comprises a filter insert 11 over which an at least semi-permeable component 12 is provided on the inflow and/or the outflow side. Semi-permeable component 12 may, for example, be constructed in the form of a perforated plate. By at least partially covering the filter surface, the semi-permeable component 12 serves to equalize the pressure distribution across the entire filter surface. This pressure equalization results in uniform particle loading in the air stream and on the surface of the filter, and the uniform particle loading, in turn, decreases the overall pressure drop across the filter and improves the flow behavior of air which is passed through the filter.

The semi-permeable component 12 shown in FIG. 3 is accommodated in a frame 14 that covers the entire filter surface. The remaining part 15 of the frame 14, which has a coarse grid and is therefore fully permeable, serves merely to support the filter surface. The distribution of the air stream caused by the perforations 16 has the effect that the filter insert 11 is loaded uniformly, e.g., with the dust that is to be filtered.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter insert for an air filter, said filter insert comprising at least one filter element and a seal element extending along outer edges of one side of the filter element; said seal serving to sealingly seat the filter insert against housing sections of a surrounding filter housing forming an air intake tract of an internal combustion engine, wherein the filter insert is configured in such a way that air can readily flow into or out of a structural space adjacent said one side of the filter element with a minimum pressure drop, and wherein the filter element is at least partially covered on the inflow and/or discharge side by a semi-permeable component which produces an at least partial equalization of the pressure distribution in an air stream flowing through the filter element, the semi-permeable component being accommodated in a frame having a coarse grid covering the entire filter surface, and a portion of the frame, disposed between the semi-permeable component and the filter element, supporting the surface of the filter element.

2. A filter element according to claim 1, wherein the semi-permeable component comprises a perforated plate.

3. A filter element according to claim 1, wherein the filter insert is supported in the filter housing via a circumferential seal disposed on the side of the filter element and received in a seat in a lower housing section, and a sealing pressure is applied to the seal by an upper housing section mated with the lower housing section such that the face of the seal is substantially co-planar with the surface of the filter element.

* * * * *

UNITED STATES PATENT AND TRADEMARK OFFICE
CERTIFICATE OF CORRECTION

PATENT NO.       : 7,637,976 B2   Page 1 of 1
APPLICATION NO. : 11/452264
DATED            : December 29, 2009
INVENTOR(S)      : Dirnberger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 645 days.

Signed and Sealed this

Ninth Day of November, 2010

David J. Kappos
*Director of the United States Patent and Trademark Office*